(12) United States Patent
Chase (10) Patent No.: US 10,988,042 B1
(45) Date of Patent: Apr. 27, 2021

(54) VEHICLE CHARGING SYSTEM

(71) Applicant: Arnold Chase, West Hartford, CT (US)

(72) Inventor: Arnold Chase, West Hartford, CT (US)

( * ) Notice: Subject to any disclaimer, the term of this patent is extended or adjusted under 35 U.S.C. 154(b) by 0 days.

(21) Appl. No.: 16/601,685

(22) Filed: Oct. 15, 2019

Related U.S. Application Data (60) Provisional application No. 62/744,835, filed on Oct. 12, 2018.

(51) Int. Cl.
  *B60L 53/30* (2019.01)
  *B60L 53/38* (2019.01)
(52) U.S. Cl.
  CPC ............. *B60L 53/305* (2019.02); *B60L 53/38* (2019.02)
(58) Field of Classification Search
  CPC .................................................... B60L 53/305
  USPC ......................................................... 320/108
  See application file for complete search history.

(56) References Cited

U.S. PATENT DOCUMENTS

| | | | |
|---|---|---|---|
| 5,821,731 A * | 10/1998 | Kuki | B60L 53/12 320/108 |
| 9,581,997 B1 * | 2/2017 | Penilla | G06Q 20/18 |
| 9,694,685 B2 * | 7/2017 | Ricci | B60L 53/65 |
| 10,042,359 B1 * | 8/2018 | Konrardy | B60W 30/12 |
| 2009/0096413 A1 * | 4/2009 | Partovi | H01F 5/003 320/108 |
| 2010/0017249 A1 * | 1/2010 | Fincham | B60L 3/12 705/412 |

* cited by examiner

*Primary Examiner* — Robert Grant
(74) *Attorney, Agent, or Firm* — McCormick, Paulding & Huber PLLC (57) ABSTRACT

A vehicle charging system for allowing an electric vehicle to automatically recognize the presence of, and communicate to properly equipped public or private wireless electric vehicle charging station(s) in order to automatically effectuate a partial or complete charging sequence at available opportunities in order to attain a fully charged power pack at all or most times. The vehicle charging system being configured to optimize the charging session with virtually any type of electric vehicle capable of wireless charging.

30 Claims, 5 Drawing Sheets

VEHICLE CHARGING SYSTEM

CROSS-REFERENCE TO RELATED APPLICATION

This application claims the benefit of U.S. Provisional Patent Application No. 62/744,835, filed on Oct. 12, 2018, which is hereby incorporated by reference in its entirety.

TECHNICAL FIELD

The present disclosure relates to vehicle charging systems and, more particular, wireless vehicle charging systems for electric vehicles.

BACKGROUND

Conventionally, the operator of an electric vehicle exclusively made the decision as to which point in the vehicle's discharge cycle to invoke a recharging sequence, as well as selecting a particular location where the vehicle recharging would take place.

In order to recharge the power-pack of an electric vehicle, a vehicle operator would need to purposefully decide to drive to a specific location that was equipped with an electric vehicle charger, and manually effectuate a charging cycle. Typically, in an effort to prolong the time between recharging sessions, an electric vehicle is operated until its battery pack is substantially or almost completely depleted, at which point the battery-pack would ordinarily be recharged in its entirety within one continuous charging session.

This approach is not only time-consuming, but also typically requires purposeful travel to a charging station location while the vehicle is immobile for long periods of time. Inherently, this protocol also leaves an electric vehicle with a partial charge state much of the time.

SUMMARY

In accordance with the present disclosure, a vehicle charging system includes a system controller, a charging inductive coil and a receiving inductive coil. The system controller is configured to initiate a charging session between the charging inductive coil and the receiving inductive coil without human input.

In accordance with the present disclosure a vehicle charging system includes a system controller, a charging inductive coil having a plurality of individual segments, the individual segments configured to generate a plurality of different virtual charging inductive coil patterns and a receiving inductive coil. The system controller being configured to operate the charging inductive coil to selectively generate a particular virtual charging inductive coil pattern of the plurality of different virtual charging inductive coil patterns.

DETAILED DESCRIPTION

Before the various embodiments are described in further detail, it is to be understood that the present disclosure is not limited to the particular embodiments described. It will be understood by one of ordinary skill in the art that the systems, devices and methods described herein may be adapted and modified as appropriate for the application being addressed, and that such additions or modifications will not depart from the scope thereof.

Although various features have been shown in different figures for simplicity, it should be readily apparent to one of skill in the art that the various features may be combined without departing from the scope of the present disclosure.

Figure 1:
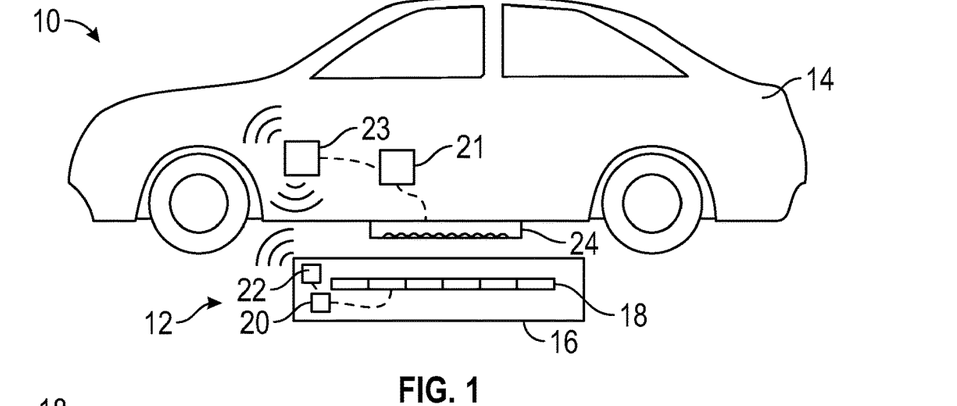
FIG. 1 is a diagram of a vehicle charging system in accordance with the present disclosure.

Referring to FIG. 1, a vehicle charging system ("VCS") 10 is shown in accordance with the present disclosure. The VCS 10 includes a base unit 12 and an electric vehicle 14. The base unit 12 includes a charging unit 16 having a charging inductive coil 18 arranged therein. A system controller 20 is operatively connected to the charging unit 16 and/or charging inductive coil 18. The system controller 20 is also operatively connected with a transceiver 22. In some embodiments the transceiver 22 may instead be a separate transmitter and receiver. The electric vehicle 14 includes a receiving inductive coil 24 arranged on a bottom side of the electric vehicle 14, facing the charging inductive coil 18 when the vehicle 14 is positioned over the charging inductive coil 18. In this embodiment, the VCS 10 is configured to virtually optimize the size and location of the charging coil to physically maximize and/or optimize energy transfer between the inductive coils 24, 18.

Figure 2:
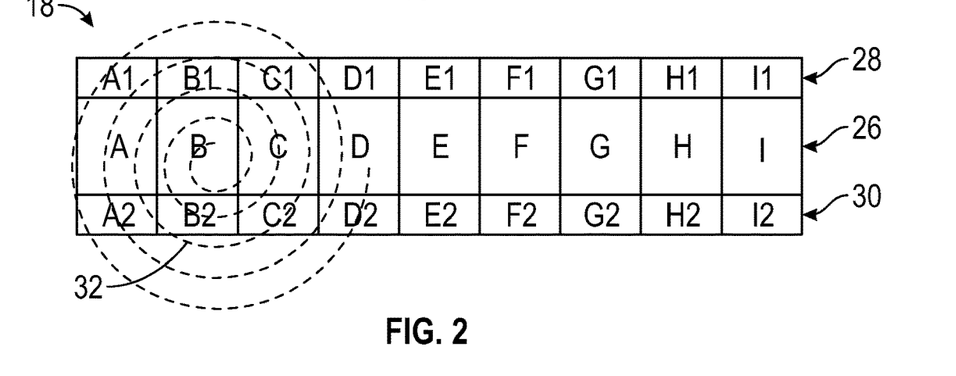
FIG. 2 is a schematic diagram of a dynamically optimized induction coil of the vehicle charging system of FIG. 1 in accordance with the present disclosure.

Referring to FIG. 2, a schematic diagram of the charging inductive coil 18 of FIG. 1 is shown. The charging inductive coil 18 is a dynamically alterable inductive coil that is configured to dynamically optimize its induction coil layout in order to physically maximize and/or optimize energy transfer between the charging inductive coil 18 and the receiving inductive coil 24.

The charging inductive coil 18 includes a middle portion 26, a first outer portion 28, and a third outer portion 30. The middle portion 26 is arranged between the first and second outer portions 28, 30. The middle portion 26 includes a first plurality of individual segments A-I. The first outer portion 28 includes a second plurality of individual segments A1-I1. The second outer portion 30 includes a third plurality of individual segments A2-I2. Each segment of the first, second and third plurality of segments 26, 28, 30 are capable of being operatively and electrically configured and connected to other segments. The VCS 10, shown in FIG. 1, is configured to dynamically configure and reconfigure the segments A-I, A1-I1, A2-I2 together to achieve a desired or needed physical configuration that delivers the maximum and/or optimum charging current to the electric vehicle 14, shown in FIG. 1. With each dynamic reconfiguration, the system 10 may determine which configuration is additive and ultimately optimum by analyzing the current changes between each successive step. With this method, the resulting charging "coil" (or virtual charging coil) can optimize both the size as well as the center location of a charging field relative to the receiving inductive coil 24 of an electric vehicle 14. Thus, the resulting charging coil or virtual coil may be constituted by any number of shape/pattern of the segments A-I, A1-I1, A2-I2. For instance, in FIG. 2, segments A-D, A1-D1, A2-D2 are active to generate a virtual charging coil 32.

While the middle portion 26 is shown as having only one outer portion 28, 30 on either side of the middle portion 26, it is within the scope of the present disclosure to have any number of portions on any side of the middle portion 26. With a greater number of outer portions, the VCS 10, shown in FIG. 1, has a greater number of active/inactive segment configurations and, thereby, greater fidelity in terms virtual coil configurations. While the middle portion 26, first outer portion 28 and second outer portion 30 have been shown and described as each having the same number of segments, it is within the scope of the present disclosure for the portions 26, 28, 30 to have differing number of segments, or for some portions 26, 28, 30 to have the same number of segments and others to have a different number of segments. Additionally, while the portions 26, 28, 30 have been shown and described as each having a plurality of segments, it is within the scope of the present disclosure for one or more portions 26, 28, 30 to have a single segment.

In operation, the VCS 10 is configured to optimize the charging inductive coil 18 to optimize which segments of the middle portion 26 (i.e. segments A-I) charge the electric vehicle 14. For instance, a "fore and aft" optimization may be performed by the VCS 10. Specifically, if the electric vehicle 14 parks such that the receiving inductive coil 24 is not arranged in alignment directly over the center of the charging inductive coil 18, the VCS 10 can optimize the charging inductive coil 18 by moving the virtual charging coil 32 fore or aft to center the virtual charging coil 32 with the receiving inductive coil 24. Similarly, the VCS 10 may perform a "side to side" optimization using the outer portions 28, 30 (or "side" coil elements) to optimize the virtual charging coil 32 relative to a center line of vehicle 14 and/or a center line of receiving inductive coil 24. The system controller 20 is configured to operate the charging inductive coil 18 to generate a particular virtual charging coil 32 of a plurality virtual charging coils the charging inductive coil 18 can possibly generate based on the available individual segments A-I, A1-I1, A2-I2. The determination of which particular virtual charging coil 32 to generate may also be based on an identity of the electric vehicle 14 being charged. For instance, different years, makes and/or models of electric vehicles may require particular virtual charging profiles that can be determined by the system controller 20 through a lookup table and/or received from a vehicle controller 21 of the electric vehicle through a transceiver 23 (FIG. 1) or separate transmitter and receiver.

Figure 3:
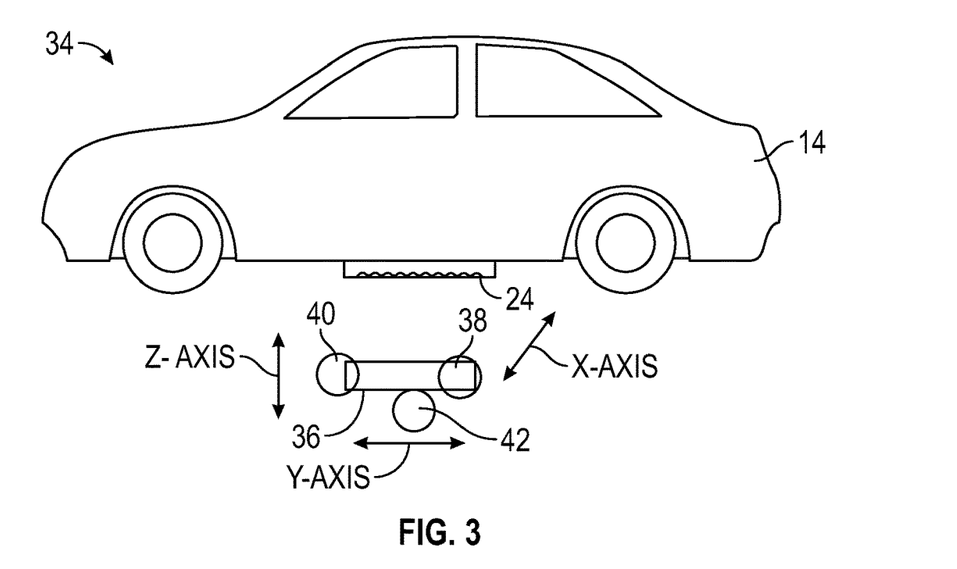
FIG. 3 is a diagram of a vehicle charging system in accordance with the present disclosure.

Referring to FIG. 3, an illustration of a VCS 34 is shown in accordance with the present disclosure. Although not shown in FIG. 3 for convenience, the VCS 34 includes the system controller 20, base unit transceiver 22, charging unit 16, vehicle controller 21 and vehicle transceiver 23, which are all shown in FIG. 1. The VCS 34 also includes a charging inductive coil 36, an x-axis motor 38, a y-axis motor 40 and a z-axis motor 42 each operatively connected to the system controller 20. The system controller 20, shown in FIG. 1, is configured to operate one or more of the motors 38, 40, 42 to physically move the charging inductive coil 36 to optimize the location of the charging inductive coil 36 relative to the location of the receiving inductive coil 24 of the electric vehicle 14 in order to physically maximize and/or optimize energy transfer between the inductive coils 24, 36. Thus, the VCS 34 is configured to move the charging inductive coil 36 in one or more axes (X, Y, Z) relative to the receiving inductive coil 24 attached to the underside of the electric vehicle 14. The VCS 34 may be configured to move the charging inductive coil 36 back and forth along all three axes sequentially, or substantially simultaneously, to find a point on each axis of movement that delivers the maximum or optimum amount of charging current to the electric vehicle 14. Although shown with a single motor for each axis of movement, in some embodiments, there may be more than one motor for each axis (X, Y, Z). Alternatively, one or more of the axes (X, Y, Z) may not include a motor 38, 40, 42, in which case the VCS 34 may only be able to move the charging inductive coil 36 in one or two degrees of freedom as opposed to three. Using the motors 38, 40, 42, the system controller is advantageously configured to move the charging inductive coil 36 to an optimum position to charge the receiving inductive coil 24 based on a position and/or orientation of the receiving inductive coil 24. The position and/or orientation of the receiving inductive coil 24 may be based on detected position/orientation of the receiving inductive coil 24 by sensor(s) of the VCS 34 and/or based on an identity of the electric vehicle 14 determined by the VCS 34, which may be based on a communication from the electric vehicle 14 to the VCS 34, or through a look up table as discussed herein.

Figure 4:
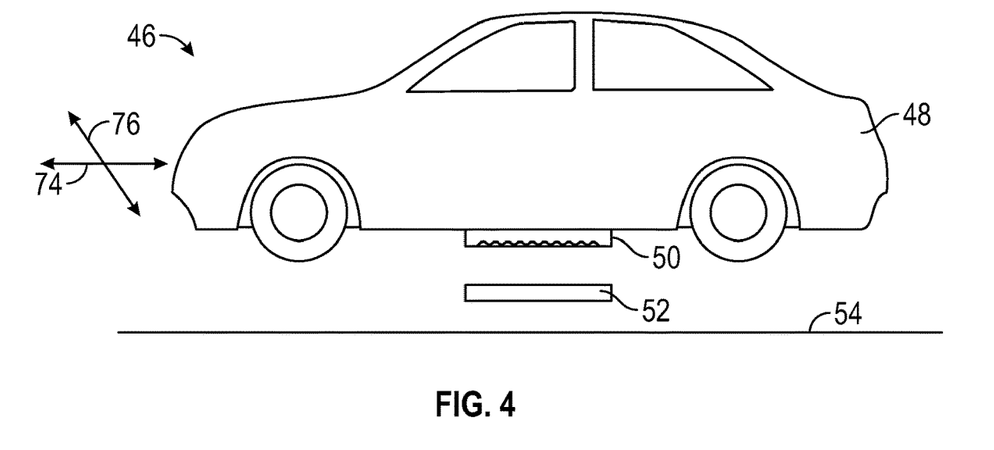
FIG. 4 is a diagram of a vehicle charging system in accordance with the present disclosure.
Figure 10:
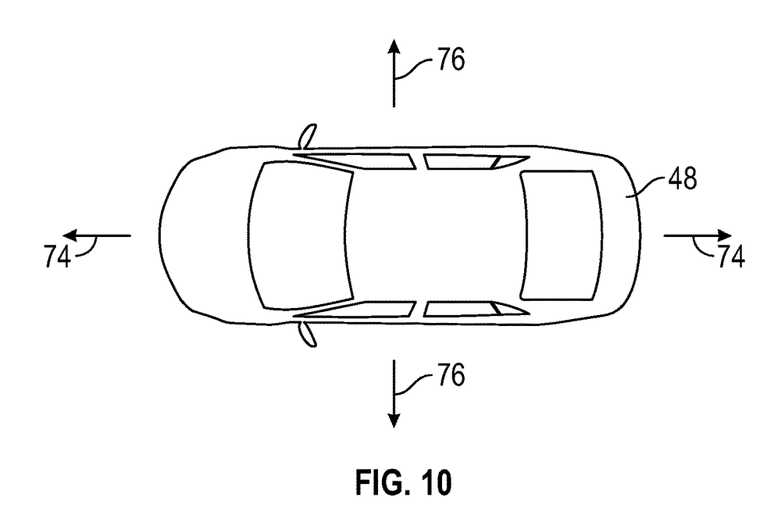
FIG. 10 is a diagram of a top view of the vehicle charging system of FIG. 4 in accordance with the present disclosure.

Referring to FIGS. 4 and 10, an illustration of a VCS 46 is shown in accordance with the present disclosure. Although not shown in FIGS. 4 and 10 for convenience, the VCS 46 includes the system controller 20, base unit transceiver 22, charging unit 16, vehicle controller 21 and vehicle transceiver 23, which are all shown in FIG. 1. The VCS 46 also includes an electric vehicle 48 having a receiving inductive coil 50 positioned above the charging inductive coil 52 when the vehicle 48 is positioned over the charging unit. The charging inductive coil 52 is configured to remain stationary relative to ground 54, and may be mounted to a slightly raised structure that would limit side to side vehicular movement, such as "guidance tracks" used in some automatic car-washing equipment systems. The VCS 46 or system controller of the VCS 46 is configured to physically optimize the relative location or spacing of the charging inductive coil 52 and receiving inductive coil 50 by commanding and/or altering the location of the electric vehicle 48 in order to physically maximize or optimize energy transfer between the two inductive coils 50, 52. In operation, as the electric vehicle 48 drives over the charging inductive coil 52, short pulses of charging energy are sent to the moving vehicle 48 from the charging inductive coil 52, with the VCS 46 and/or the vehicle 48 monitoring the amount of charging current sent to, or received by, the vehicle 48. When the charging current is observed by the VCS 46 to have risen to a predetermined threshold or to a peak point followed by a decrease the VCS 46 sends a "Stop" command to the electric vehicle 48. If the VCS 46 determines that the electric vehicle 48 has stopped at an acceptable position for optimized charging, for example, by being in a position that would deliver adequate charging in accordance with predetermined standards (which may be variable depending on the year, make and/or model of the electric vehicle 48, battery status of the electric vehicle 48, etc.), then the VCS 46 may initiate the charging session. If the VCS 46 determines that the electric vehicle 48 is not in an optimal or acceptable position, the VCS 46 may send a "Forward" or "Reverse" command to slightly move the vehicle 48 forward or backward in a first degree of freedom 74 to a physical point of maximized or optimized current flow. Similarly, the VCS 46 may send a "Left" or "Right" command to move the vehicle 48 left or right in a second degree of freedom 76. If the vehicle 48 is guided by physical guidance tracks, then left and right commands may not be necessary. Accordingly, the system controller is configured to optimize a transfer rate of energy from the charging inductive coil 52 to the receiving inductive coil 50 by determining a peak transfer rate of energy position of the vehicle 48 where alignment of the charging inductive coil 52 and receiving inductive coil 50 is optimal or adequate in accordance with predetermined standards. The system controller then physically directs the electric vehicle 48 to change position to move toward the determined peak transfer rate of energy position.

Figure 5:
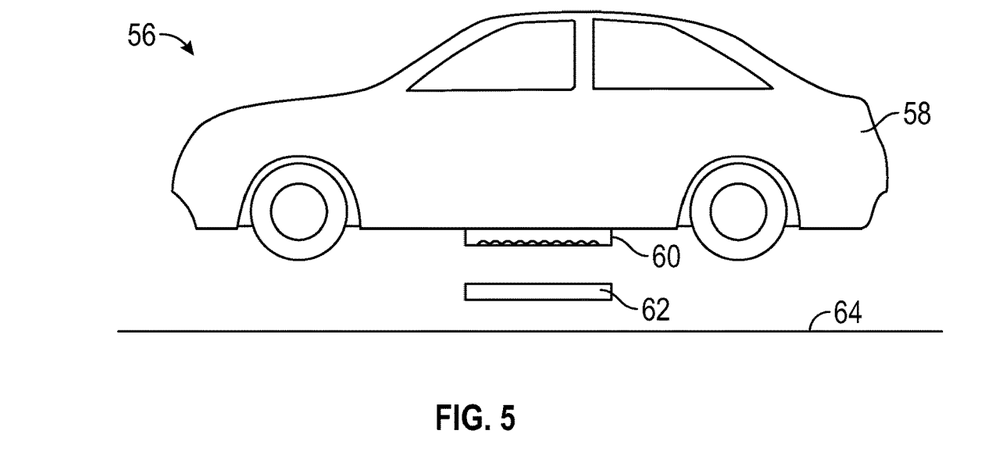
FIG. 5 is a diagram of a vehicle charging system in accordance with the present disclosure.
Figure 6:
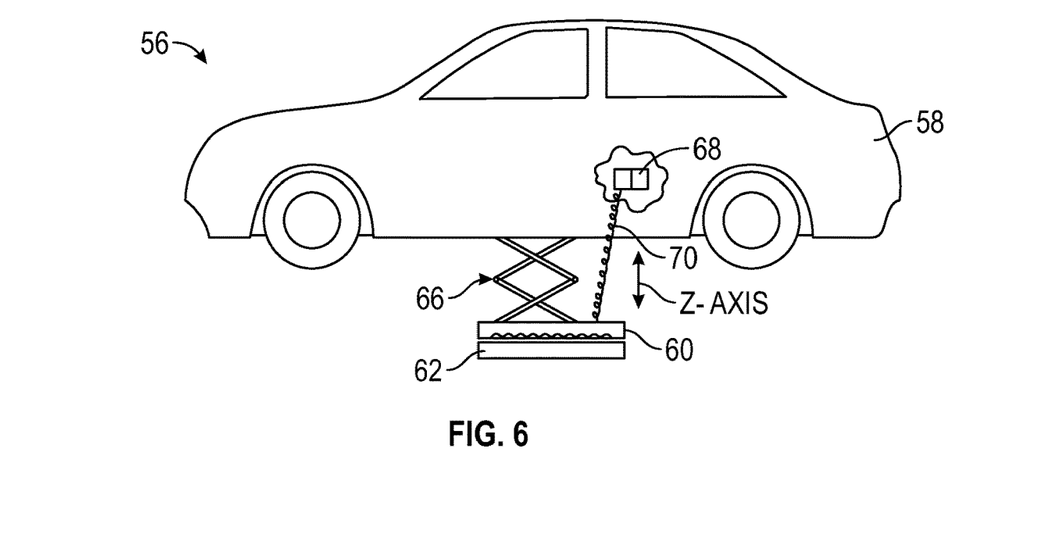
FIG. 6 is a diagram of the vehicle charging system of FIG. 5 in accordance with the present disclosure.

Referring to FIGS. 5 and 6, an illustration of a VCS 56 is shown in accordance with the present disclosure. Although not shown in FIGS. 5 and 6 for convenience, the VCS 56 includes the system controller 20, base unit transceiver 22, charging unit 16, vehicle controller 21 and vehicle transceiver 23, which are all shown in FIG. 1. The VCS 56 includes an electric vehicle 58 having a receiving inductive coil 60 positioned above a charging inductive coil 62 when the vehicle 58 is over the charging unit. The charging inductive coil 62 is configured to remain stationary relative to ground 64. The VCS 56 or system controller of the VCS 56 is configured to physically optimize the relative location of the charging inductive coil 62 and receiving inductive coil 60 in order to maximize or optimize energy transfer between the two inductive coils 60, 62. To do so, the VCS 56 is configured to move the receiving inductive coil 60 up and down in a degree of freedom in a vertical direction (z-axis). The movement of the receiving inductive coil 60 in the vertical direction alters the relative position or spacing of the receiving inductive coil 60 and the charging inductive coil 62. The receiving inductive coil 60 being movable in a direction towards the charging inductive coil 62 may advantageously increase the inductive coupling and minimize free-space energy losses during charging.

The actuator 66 for moving the receiving inductive coil 60 may include a motor or drive and a scissor linkage to lower the receiving inductive coil from the electric vehicle 58. The actuator 66 may terminate the lowering process at the point where no further current flow gain is observed or determined by the VCS 56 either through sensors or through communication with the vehicle controller. At the conclusion of the charging process, prior to the vehicle being enabled to move from the X/Y axis charging position, the lowering actuator 66 may withdraw the receiving inductive coil 60 to an initial or retracted position (e.g. a "home" position proximate or against the underside of the vehicle 58). In FIG. 5, the receiving inductive coil 60 is shown in the retracted position. In FIG. 6, the receiving inductive coil 60 is shown in an extended position (full coil extension). In operation, when the receiving inductive coil 60 is in the extended position (FIG. 6), the charging current (or energy) generated by the charging inductive coil 62 in the receiving inductive coil 60 may be transferred to a power pack 68 of the electric vehicle 58 through a power cable 70, for example, a retracting power cable 70. In some embodiments, the charging may be accomplished even when the power cable 70 is not in a fully extended position. For example, charging may occur when the power cable 70 is in a partially extended position or fully retracted position.

Figure 7:
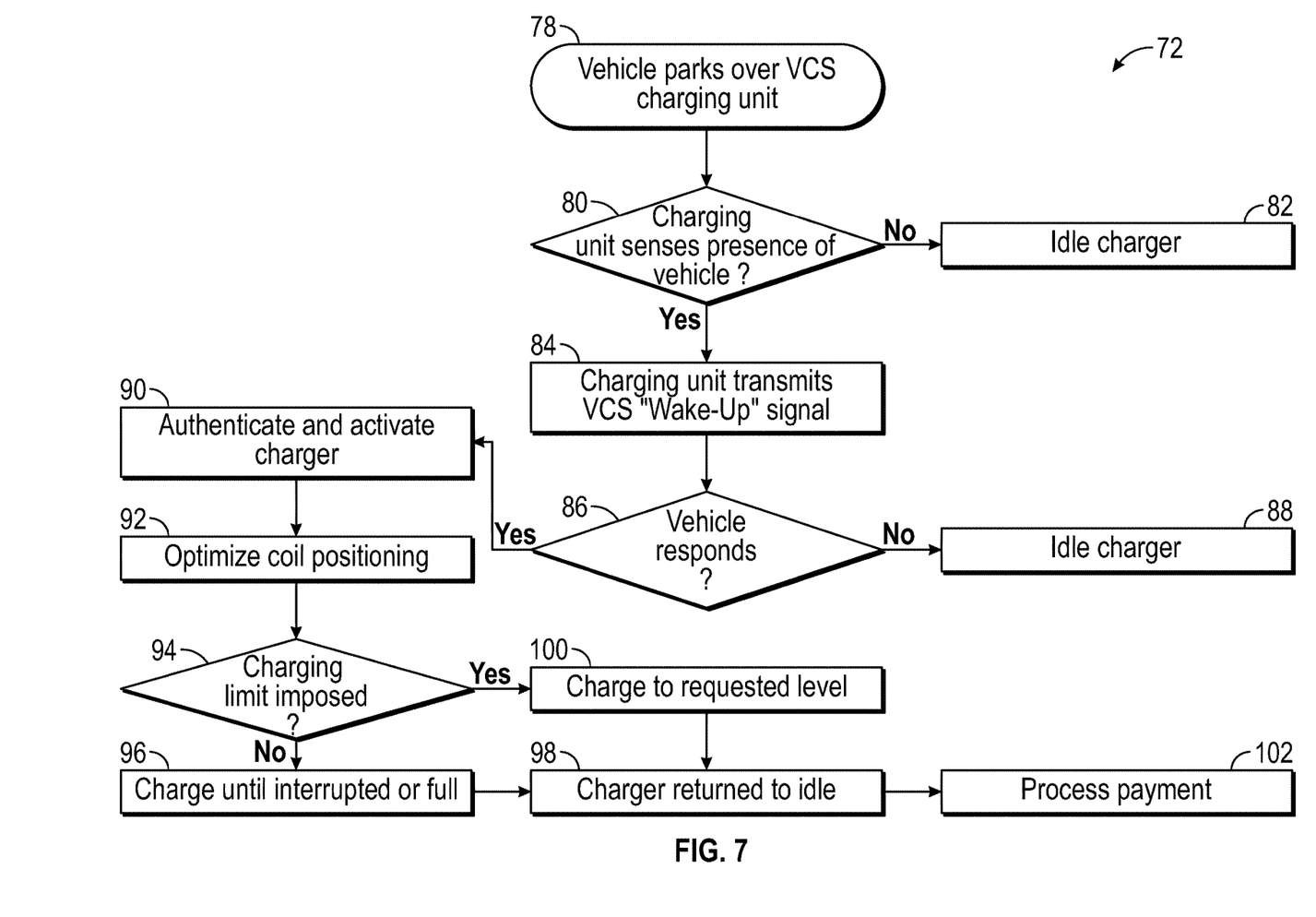
FIG. 7 is a flow diagram of an operational method of a vehicle charging system in accordance with the present disclosure.

Referring to FIG. 7, a flow diagram 72 of an operational method for a VCS is shown in accordance with the present disclosure, such as for the VCSs 10, 34, 46, 56 shown in FIGS. 1 and 3-6 and discussed above or the VCS 126 shown in FIG. 9 and discussed below. The method begins at block 78, where the electric vehicle parks over (or near) a charging unit of a vehicle charging system. At block 80, the charging unit (or a system controller associated with the charging unit) senses or detects whether or not there is a presence of an electric vehicle either through proprietary communication with the system controller through the charging coils, or through communication between the system controller and vehicle controller utilizing common short-range methodology in common use such as Bluetooth, etc. A VCS may also determine if an eligible electric vehicle is present by periodically emitting short-duration pulses of energy. The system controller may determine the presence of the electric vehicle through monitoring of outward energy flow. If no presence is detected, the charging unit is idled at block 82. If presence is detected, the charging unit (or the system controller) transmits a "wake-up" signal at block 84. Then at block 86, the VCS determines whether or not the electric vehicle responds to the wake-up signal. The VCS may determine if the electric vehicle responds to the wake-up signal through communication with the vehicle controller through common short-range signaling protocols such as Bluetooth, etc., and/or by modulating the output of the charging inductive coil recognized by the electric vehicle and/or by the electric vehicle modulating acceptance of the energy transferred to the receiving inductive coil to digitally superimpose a "vehicle to VCS" message. If no response is detected, the charging unit is idled at block 88. If a response is detected, the VCS proceeds to block 90 and activates the charging unit if the electric vehicle identity is authenticated and has been previously registered as being eligible for charging with the VCS 10, 34, 46, 56. A VCS may authenticate the electric vehicle by communicating with a central database to verify that the electric vehicle requesting a charging session is registered and has a valid payment method on file. At block 92, the VCS proceeds to optimize the relative coil positioning of the charging inductive coil and/or the receiving inductive coil by one or more of the methods disclosed herein depending on the configuration of the VCS. Then, at block 94, the VCS (e.g. a system controller of the VCS) determines whether there is a charging limit imposed by the vehicle. If no charging limit is imposed, at block 96 the VCS initiates a charging session and continues to charge the electric vehicle until the vehicle's power pack is full or the charging session is interrupted. After the charging is finished due to completion or interruption, the charging unit is returned to idle at block 98. If there is a charging limit imposed at block 94, the VCS proceeds to block 100 where a charging session is initiated in which the VCS continues to charge the electric vehicle until the requested charge level is reached. Then the VCS proceeds to block 98 and returns the charging unit to idle. Then, at block 102, the VCS proceeds to process payment for the charging session as disclosed herein.

Figure 8:
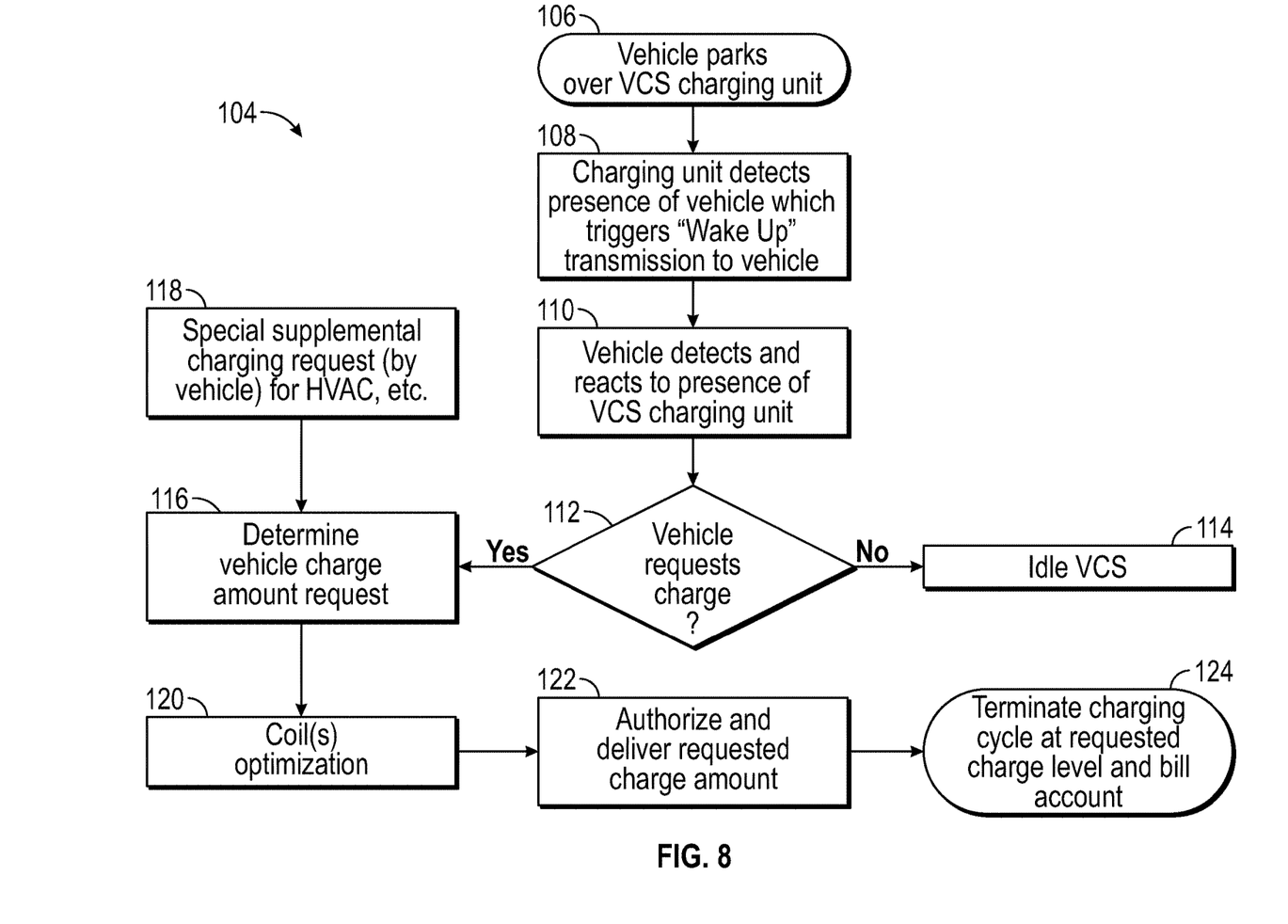
FIG. 8 is a flow diagram of an operational method of an electric vehicle of a vehicle charging system in accordance with the present disclosure.

Referring to FIG. 8, a flow diagram 104 of an operational method for an electric vehicle is shown in accordance with the present disclosure, such as for the electric vehicles 14, 48, 58 shown in FIGS. 1 and 3-6 and discussed above. The method begins at block 106, where the electric vehicle parks over (or near) a VCS charging unit such as the charging units of VCS 10, 34, 46, 56. Then, at block 108, the charging unit detects the presence of an electric vehicle, which triggers a wake-up transmission signal from the charging unit (or system controller of the charging unit) to the electric vehicle. Then, at block 110, the electric vehicle, if compatible and/or eligible with the charging system, responds to the wake-up transmission signal either utilizing the vehicle's and charger's coils, or directly to the system controller utilizing short-range communications protocols in common use such as Bluetooth, etc. Specifically, after the determination by the VCS that the electric vehicle is in proximity of the VCS, at block 112 the vehicle (or vehicle controller) determines whether the vehicle is requesting a charge. If no charging is desired by the vehicle, at block 114, no request for charging is generated and the VCS or charging unit is idled. If a request for charging is generated, then at block 116 the vehicle (or vehicle controller) determines a vehicle charge amount or level request. The vehicle charge amount determination may also be based on a special supplemental charging request 118, for example, based on heating, ventilation and air conditioning requirements or target load of the electric vehicle. In such a case, the vehicle may command the VCS to operate continuously irrespective of the power pack charge level. Then, at block 120, the charging inductive coil and receiving inductive coil are optimized by one or more of the methods and systems disclosed herein depending on the configuration of the VCS. Then, at block 122, the electric vehicle's charging session is authorized by the VCS and the requested charge amount is delivered to the electric vehicle during a charging session (unless the charging session is interrupted). Then, at block 124, the charging session is terminated after the requested charging amount has been delivered, an account is billed based on the identity of the electric vehicle.

Figure 9:
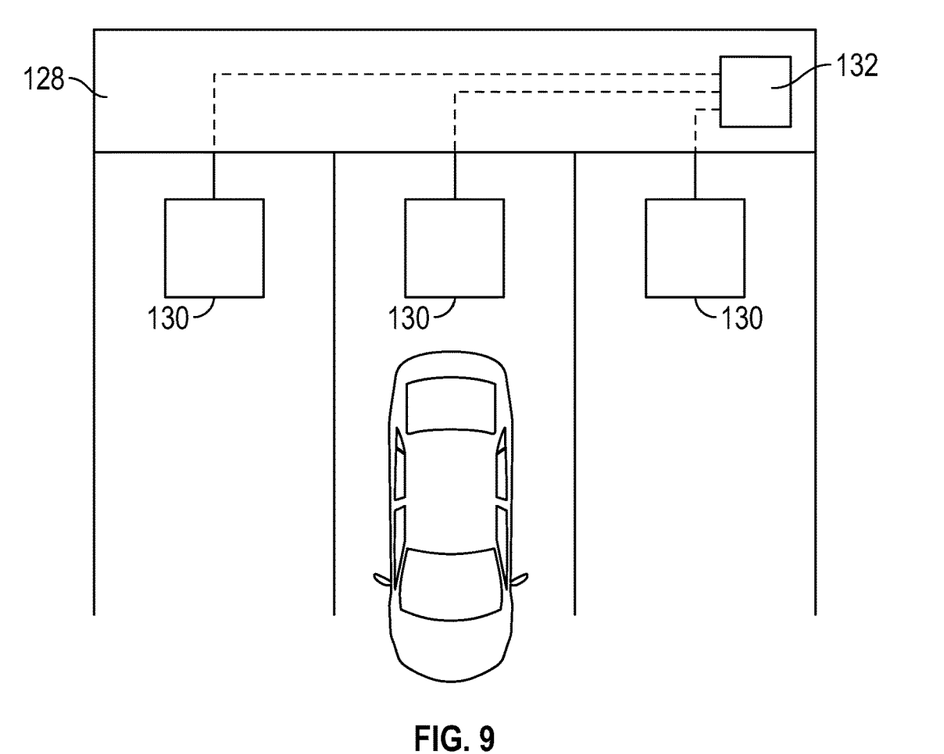
FIG. 9 is a diagram of a plurality of charging units and a common power bus in accordance with the present disclosure.

Referring to FIG. 9, an illustration of a VCS 126 is shown in accordance with the present disclosure. The VCS 126 includes a common power bus 128 in connection with a plurality of charging units 130 in accordance with the present disclosure. One or more of the charging units 130 may be configured like the charging units 16 discussed above in connection with the VCSs 10, 34, 46, 56 shown in FIGS. 1 and 3-6. Each charging unit 130 has a charging inductive coil arranged therein. One or more of the charging units 130 may be configured for ensuring adequate pairing with a receiving inductive coil of an electric vehicle as disclosed herein depending upon the configuration of the units 130. A system controller 132 is operatively connected to the plurality of charging units 130. The system controller 132 is configured to operate each of the charging units 130 in accordance with one or more methods for maximizing or optimizing energy transfer to an electric vehicle as disclosed herein. The common power bus 128 is configured to be connected to additional charging units 130 should the need or desire arise to increase the number of vehicles that can be charged by the VCS 126. The system controller 132 can activate or deactivate charging units 130 based on the presence or lack of presence of an authorized electric vehicle in charging range of the charging units 130. Accordingly, power can be effectively managed and distributed to the appropriate charging units 130.

In some embodiments, the amount of energy transferred from the charging inductive coil 18, 36, 52, 62 to the receiving inductive coil 24, 50, 60 and/or the rate of energy transfer from the charging inductive coil 18, 36, 52, 62 to the receiving inductive coil 24, 50, 60 is determined, monitored or metered by the system controller 20 and/or base unit 12 (i.e. monitoring the "outward" energy flow). In some embodiments the amount of energy transferred and/or the rate of energy transfer is determined, monitored or metered by the vehicle controller 21 and/or electric vehicle 14, 48, 58 (i.e. monitoring the "inward" energy flow). In some embodiments, both the outward and inward energy flow is monitored.

In some embodiments, the system controller of the VCS is configured to command an ineligible vehicle to move away from a parking space associated with the charging inductive coil. A VCS may determine a vehicle to be an ineligible vehicle if a vehicle positioned in the parking space associated with the electric vehicle is not capable of being charged by the charging inductive coil. For example, if the vehicle does not respond to the short-duration charging pulses, then the VCS may determine that the electric vehicle is not eligible for charging at the VCS.

While embodiments of the present disclosure have been shown and described as the base unit, charging unit and/or charging inductive coil being on a ground or floor surface and radiating "upward" towards a downward facing receiving inductive coil, it is within the scope of the present disclosure for the charging elements to be also able to be arranged in any plane relative to a vehicle such as, for example, a wall or side frame alongside a vehicle in which case the receiving inductive coil would be located on a side (for pairing with a side-mounted charging inductive coil) or on top (for pairing with an overhead charging inductive coil) of the electric vehicle for optimal pairing with the charging inductive coil. The systems and methods for appropriately effectuating an automatic and optimized wireless charging session of the electric vehicle are equally applicable to configurations where multiple charging elements may be simultaneously arranged in a charging area, with the system controller determining which charging unit to energize based on which charging unit is responded to by a vehicle.

In embodiments according to the present disclosure, as an electric vehicle passes over the charging inductive coil of one of the VCSs 10, 34, 46, 56, 126, repeated short-duration charging pulses of energy are emitted from the VCS charging inductive coil(s) with the VCS monitoring these pulses to detect an increase in power flowing from these coils beyond the nominal eddy losses, which signals to the VCS that an electric vehicle has moved into position adjacent to the charging coil. Once energized, the amount of current flowing through the coils will rise as the vehicle's receiving induction coil approaches the optimum charging alignment (peak power transfer level), and then start to fall off as the optimum alignment position is passed. When this happens, the VCS charging equipment notifies the vehicle that it has passed the optimum position. If the electric vehicle is a driven vehicle, the VCS may notify an operator of the vehicle through audible and/or visual indications, or if the electric vehicle is an autonomous vehicle (driven without the need for human intervention) the VCS may control the vehicle through one or more positioning instructions (e.g. to slightly reverse the vehicle's travel). Thus, advantageously, a system controller of the VCS may be configured to initiate a charging session between the charging inductive coil and the receiving inductive coil without human input.

With the VCSs in accordance with the present disclosure, such as VCSs 10, 34, 46, 56, an electric vehicle itself would generally transparently and continuously (or semi-continuously) attempt to keep recharging itself at every practical available charging opportunity. Since this charging would normally be done without human input, at a certain point in time by which there will exist a "critical mass" of VCS charging locations, the need for an electric vehicle to ever require a purposeful "manual" charging session or drive to a charging station will be rendered moot.

At the present time, most electric vehicles utilize "plug-in" charging equipment requiring human intervention in order to effectuate the recharging of its battery pack. Increasingly, however, vehicles are being equipped with "wireless" induction charging capability, typically for use with home recharging equipment. It is anticipated that inductive charging equipment will migrate to "out of home" locations such as public charging stations as well. Due to the inherent decreased charging efficiency of induction charging (as compared to "plug in" charging), said efficiency diminishment just adds to the time required to recharge an electric vehicle, and as such, with the present "manual" charging equipment induction charging is not used in purposeful charging sessions that typically require almost the entire battery capacity to be recharged each recharging session.

Since the VCSs in accordance with the present disclosure may operate automatically as a continual background process, said inherent efficiency losses and the corresponding recharge-time increases becomes moot. Thus, in some embodiments, a VCS may be considered as a continuous sequential charging system ("CSCS"). With CSCS, inductive charging units and coils, as part of an overall CSCS infrastructure, will be increasingly incorporated into parking spaces in parking garages, outdoor parking lots, restaurants, shopping centers, within on-street parking spaces, as well as any other parking location that an electric vehicle would be expected to stay stationary on a short to medium-term time basis. The same technology and procedure would also be largely utilized in home environments as well, to continuously ensure that an electric vehicle is able to be charged as much as possible between driving sessions. Accordingly, electric vehicles with VCS equipment would normally be configured to automatically and autonomously initiate charging sessions in accordance with battery management control strategies at home as well as at commercial locations without human input, to maximize the automatic recharging opportunities thereby enhancing the user experience of the electric vehicles.

Each VCS inductive parking space may be operatively connected with corresponding VCS support equipment. For each parking space that is equipped with a VCS enabled charging unit or coil(s), additional equipment may be installed that senses when an inductively charge-capable vehicle has generally positioned itself above said space. This detection of said vehicle is accomplished by the charging unit or coil(s) continually sending out short duration energy pulses, which are monitored to detect the characteristic increase of energy transfer between air-coupled inductive coils as a signal that an EV is proximate to the VCS charging equipment within a parking space. Upon such detection, the VCS equipment then attempts to communicate with the electric vehicle to determine if the EV is VCS compatible through a propriety "wake-up" activation transmission signal, or alternatively through known short-range transmission equipment or methods (such as Wi-Fi, Bluetooth, etc.), or through the inductive charging coils themselves to the vehicle in that that space. Any vehicle that is equipped with VCS-compatible equipment (and is desirous of a charging session) may autonomously respond with an "I am here and I want to charge" response to the VCS charging equipment.

If no explicit charging request from a VCS equipped vehicle is received by the VCS charging equipment, then the VCS charger stays in an idle condition. If a non-VCS compatible vehicle is parked over VCS equipment, then the system is capable of illuminating or displaying a sign indicating that the parking space is reserved for VCS-equipped vehicles ONLY, or in the case of a non-VCS equipped autonomous vehicle trying to park in that space, notifications and/or movement commands may be sent to the incompatible vehicle. If, however, a compatible electric vehicle determines that a charge is desired, a responsive affirmative signal from the electric vehicle is returned to the VCS equipment, along with a maximum level of charge that the EV requests (e.g. "charge until full" or "add 10% to the existing charge level"). Typically, a CSCS equipped vehicle would continually take advantage of every VCS charging location opportunity to accomplish as much charging as possible in order to bring the vehicle's battery-pack back to a 100% charge condition, which would normally occur every VCS charging location opportunity.

The vehicle to charging equipment signaling exchange (or communication exchange) may comprise encrypted communication of any vehicle identifying information and/or account information during any data or billing exchange. Upon verification by the VCS charging equipment of a valid and active billing account, the inductive charging session would begin. At the completion of a charge cycle, or alternatively when the vehicle leaves the charging spot, the charging equipment would stop the charging process and appropriately bill the account of the vehicle that had just received the charge for an amount commensurate of prevailing rates or in an amount at a previously agreed or determined rate.

Advantageously, the operation of the VCS equipment may be autonomously triggered in order to effectuate a charging session. Because VCS utilizes wireless charging equipment that does not require a physical connection (e.g. a charging plugin adapter) between the charging equipment and a vehicle, this allows an automatic as well as an autonomous charging session to transparently take place without operator intervention. During the recharging process, the VCS-equipped vehicle sends periodic charging status reports to the charging equipment which allows said equipment to terminate the recharging process at the desired battery-pack charge level, or if the vehicle drives away from the charging location.

Because there may be substantial variation in the size and/or location of an inductive charging receiving coil between different types and sizes of vehicles, a VCS may incorporate at least three methods for optimizing the physical orientation and energy efficiency of the charging process. One method of physical orientation optimization of the charging coils is a Dynamic Coil Configuration ("DCC"), which is configured to dynamically form a whole virtual charging coil from separate adjacent coil segments by combining said segments to achieve a virtual overall size and location that delivers the highest or optimized energy transfer for each vehicle model or type. In accordance with principles of the present disclosure, the DCC is configured to adapt to virtually any kind of inductive charging system of an electric vehicle. For example, the DCC may operate similarly to electrically adjustable "combination burners" on an electric range, whereby a user can electrically and operationally adjust the size of a single burner that has been divided into concentric heating element segments, and then enable or disable said segments to achieve a desired burner size.

A second method of achieving physical compatibility is Tri-Axial Positioning ("TAP"), which utilizes one or more positioning motors to adjust the charging coil(s) in the "X", "Y" and/or "Z" axes relative to the center location of the vehicle's charging coil. After a vehicle has positioned itself and is parked over the charging pad, the charging pad begins to send out charging energy to the vehicle's charging coil(s). The initial power acceptance rate is analyzed, and then as one or more of the charging pad's axis motors are activated, the resultant repositioning of the charging coil(s) is determined by the position of each axis that results in the highest rate of energy delivery compared to the initial energy delivery rate. For example, the one or more axis motors may be activated first in one direction, and then in the opposite direction, with the acceptance power measured after each movement in order to direct the charging pad to the optimum location in each of the three axis directions. This method is particularly suitable for large trucks and other such vehicles, as their ground clearance is typically much greater than that of a passenger vehicle. As such, in order to efficiently inductively couple the charging supply and receiving coils, the distance between the pads may be minimized. As part of the data exchange between the CSCS charging equipment and a vehicle, information about physical characteristics of the electric vehicle may also be transmitted to the VCS or determined by the VCS. For example, the information about the physical characteristics of the electric vehicle may include the height above the ground of the vehicle's charging coil as well as the ground clearance of the vehicle so the charging pad may be elevated as high as possible while still allowing an unexpected "drive-off" without physical interference.

The third method of achieving physical compatibility is Commanded Vehicle Relocation ("CVR"), which keeps the charging coil(s) in a fixed "X/Y" position, but sends small "position correction" commands to the vehicle as a result of monitoring the acceptance power during a sequence of charging pulses while the vehicle is making said small "fore and aft" positioning corrections in order to find and achieve the position that results in the highest or optimized energy transfer rate.

While various methods and systems of achieving physical compatibility of a vehicle charging system have been individually shown and described herein, the methods and systems are not mutually exclusive and may be simultaneously combined. Additionally, for vehicles so equipped, an electric vehicle and a VCS-compatible charging location can exchange charge-rate information to trigger adjustments to the vertical height of the vehicle's inductive charging coil, should the vehicle be so equipped and proximate to a charging coil without adjustable "Z"-axis movement capability. An exemplary embodiment of this feature may utilize a scissors-type jack mechanism attached between the vehicle's underside and the vehicle's induction coil to easily alter the coil to ground (charging pad) distances.

While the VCS equipment in a vehicle is capable of and would be expected to operate in an "automatic" mode wherein it would always seek a charge at every possible opportunity, each VCS vehicle may also be capable of operating in an alternative mode such as in a "one time" charging request that asks that a specific charge amount be completed at the first available charger and nothing further, or alternatively in an "off" mode that sought no automatic charging. Further, since the cost per Kilowatt Hour (kWh) for electricity from a public charging location may be expected to be at a higher rate than that offered to a home-based charger, the VCS system may contain the ability to narrow the "acceptance" criteria of charging locations (e.g. private vs. public charging locations rates), or by explicit kWh pricing level limit criteria. The operating mode may be modified by the vehicle driver at any point through controls within the vehicle, or remotely in the case of an autonomous vehicle or fleet operations center.

Existing "conventional" or "traditional" (e.g. "plug-in") electric vehicle charging stations may also be modified to additionally be compatible with VCS vehicles as well, by the addition of appropriate VCS equipment, including an adjacent inductive charging unit or coil(s). For effectuating a traditional "manual plug-in" charging session, the charging operation would be accomplished in a conventional fashion. The charging equipment, however, upon recognizing a VCS charging request transmission from a VCS compatible vehicle that had parked over a connected charging coil, would shift the control and charging output from the 'normal' power plug to the adjacent VCS inductive charging unit or coil(s), which would allow the vehicle to directly begin the charging process without its operator needing to exit the vehicle.

Since an electric vehicle does not need a running internal-combustion engine to provide vehicle interior heating, cooling, or electrical power, there is no carbon monoxide generated during such operations, thus it is safe to run an electric vehicle's heating, cooling, or powering auxiliary electrical equipment systems in an enclosed garage or enclosed space for an extended time prior to an operator accessing the vehicle. Regardless of whether a vehicle were located in a home garage, outdoor parking location, or in a public indoor or outdoor parking location, VCS would not only allow completely safe remote and/or programmed pre-heating or cooling of a vehicle, but with charging provided by VCS equipment such operation would occur without diminishing the vehicle's power-pack and range potential.

Because VCS enables an ability for extended safe, practical, unattended cooling and/or heating without battery-pack draining consequences, it opens up the possibility of a vehicle automatically sensing whether there is a moving object (e.g. infants, sleeping child, pets) within a locked vehicle that is experiencing an interior temperature extreme, and automatically enabling the HVAC system of said vehicle. Even as a routine matter, the ability to operate an unattended HVAC system in a vehicle allows perishable goods to survive a vehicle's interior in either hot and sunny weather, or in freezing conditions. Operationally, the VCS equipment in an electric vehicle would constantly monitor the electric vehicle's power-pack charge state and the vehicle's electric demand and would automatically command a charging start if the vehicle began drawing power for unoccupied heating, cooling, or any other significant power draw, if the vehicle was positioned at a VCS charging spot. In such a situation, the VCS charging equipment would be able to charge the power-pack equal to the discharge rate of the operating HVAC equipment so as to maintain an optimized power-pack charge level.

While embodiments have been shown and described herein in connection with present "driven" electric vehicles, the systems, devices and methods described herein are also suitable for use with autonomous electric vehicles, either individually or fleet operated. Embodiments according to the present disclosure are also compatible for use with electric freight and delivery vehicles, wherein said vehicles could automatically recharge while parked at freight terminal loading docks, delivery stations, etc. during cargo loading and unloading, thus eliminating or minimizing the need for additional or supplemental recharging.

While the description has exemplified a single (or stand-alone) charging lane and equipment, a VCS is able to, and in some instances in a more cost effective manner, supply and operate an entire group or bank of charging units or coils within a general physical location. The power supplies for the charging equipment is fully modular in nature, and may consist of a single power supply module suitable for a "stand-alone" charging unit or coil(s), up to a system that includes numerous paralleled power supply modules that can handle hundreds of charging "spaces" simultaneously while sharing described common system equipment. While only a single control system is needed for any number of co-located charging "spots" at, for instance, a parking garage, the number of power supply modules needed may start off with only one, and increase up to a 1:1 power supply to charging unit/coil(s) ratio as simultaneous charging demand increases. The system controller monitors the charging demand, and if additional demand would exceed the capacity of the installed power supplies, said additional demand would be locked out until the needed capacity became available.

A multiple charging configuration in accordance with embodiments of the present disclosure may be accomplished with a single on-site controller. The single on-site controller may be operationally connected to one or more charging units/coils. All of the control, status, and communications functions for each charging space/unit location are operatively controlled from this "master" on-site controller.

Each charging space/unit location in a general area is operationally connected to the output of one or more charging power supplies through one or more common power buses. While a "stand-alone" VCS charging system only needs a charging power supply with an output rating sufficient for a single vehicle to be charged, for a bank of charging spaces, a larger or multiple charging power supplies feeding a power bus in parallel would be utilized with the inherent capacity and capability to charge multiple vehicles simultaneously. In contrast to the "stand-alone" charging-lane configuration that has the charging power supply output directly connected to a dedicated charging unit or coil, in a multiple charging space configuration the output of the charging power supply/supplies is fed to a common power bus or power rail. At each charging location/space, a relay or other power switching equipment would be activated as needed to allow said space to be energized from the common power supply rail. Current sensing and/or voltage sensing at each individual space would monitor and record the power used from each charging space during a charging session for billing purposes.

Initially, with the present mix of vehicles favoring internal combustion engines (that do not need electric charging), the initial low utilization rate for VCS charging system spaces would not warrant a 1:1 charging power supply to charging pad ratio. The ratio of charging units to charging power supplies initially can be quite high, as the charging power supplies would not initially be called upon to simultaneously charge a large number of vehicles. As the majority of vehicles in operation transition to electric vehicle technology, the demand for simultaneous charging would increase. Additional charging power supplies may be added to the common power bus(es) as needed to eventually allow for all charging units to be simultaneously connected to the power bus. Given that the number of charging units and the number of corresponding charging power supplies can be increased or decreased, a VCS may advantageous be modular in nature to minimize "up-front" cost.

As an added benefit, a CSCS may prolong the operational life of an electric vehicle battery pack by always or frequently strive to keep the electric vehicle battery pack fully topped off or at substantially full charge, thereby minimizing the depth of discharge degradation of lithium-based and other power packs.

Additionally, an electric vehicle always or usually having a fully charged battery pack would add a greater level of safety by maximizing the number of occasions when full-range travel ability is available, which is critical in times of emergency, such as evacuation or need to drive to a location far away such as a hospital. Further, by always or usually having a full battery pack, the CSCS may ensure that the maximum amount of emergency heating time is available if an electric vehicle were trapped in a snowstorm or other winter emergency. Additionally, always or usually having a full battery pack charge while parked at a home location provides the ability of the EV to feed power to a home or a micro-grid during an outage situation by ensuring that the VCS keeps battery pack is fully recharged at all or most times. Accordingly, a system controller of a VCS or CSCS may configured to supply power to an electric vehicle, even if a battery pack of the electric vehicle is fully charged or substantially fully charged, in order to accommodate the power needs of electrically powered accessories located within the electric vehicle, such as, for example, heating and cooling systems, refrigerators, etc. without depleting the vehicle's battery pack.

While the present disclosure has been illustrated and described with respect to particular embodiments thereof, it should be appreciated by those of ordinary skill in the art that various modifications to this disclosure may be made without departing from the spirit and scope of the present disclosure. For example, while the present disclosure shows and describes a VCS for electric car vehicles, it should be readily understood that principles of the present disclosure can be applied to other electric vehicle applications such as, for example, boats, drones and airplanes.

What is claimed is:

1. A vehicle charging system comprising:
   a system controller;
   a charging inductive coil;
   a receiving inductive coil connected to an electric vehicle; and
   a vehicle controller arranged on the electric vehicle;
   wherein the system controller is configured to self-initiate a charging session between the charging inductive coil and the receiving inductive coil without human input;
   wherein the system controller is arranged in a base unit that is not arranged on a vehicle;
   wherein the system controller is configured to determine one or more physical characteristics of the electric vehicle based on communication with the vehicle controller;
   wherein the one or more physical characteristics comprise an undercarriage height of the electric vehicle from a ground surface and/or a receiving inductive coil height from the ground surface; and
   wherein the system controller is configured to optimize the location of the charging inductive coil relative to the receiving inductive coil and/or to optimize the location of the receiving inductive coil relative to the charging inductive coil based on the one or more physical characteristics.

2. The vehicle charging system according to claim 1, wherein the controller is configured to send a signal to the electric vehicle that the vehicle charging system is available.

3. The vehicle charging system according to claim 2, wherein the vehicle controller of the electric vehicle is configured to determine whether or not to self-initiate a charging session based on a charging availability signal sent to the electric vehicle by the system controller and based on settings of the vehicle controller.

4. The vehicle charging system according to claim 3, wherein the vehicle controller is configured to send an acceptance signal to the system controller to initiate a charging session.

5. The vehicle charging system according to claim 4, wherein the vehicle controller is configured to communicate to the system controller a target charge level.

6. The vehicle charging system according to claim 5, wherein the system controller is configured to validate a payment method prior to initiating a charging session with the electric vehicle.

7. The vehicle charging system according to claim 5, wherein the system controller or the vehicle controller is configured to terminate the charging session after a requested recharge level is achieved.

8. The vehicle charging system according to claim 5, wherein the system controller is configured to bill a billing account associated with the electric vehicle that reflects the amount of charging that was performed for the electric vehicle.

9. The vehicle charging system according to claim 1, further comprising a first motor configured to move the charging inductive coil back and forth along a first axis.

10. The vehicle charging system according to claim 9, further comprising a second motor configured to move the charging inductive coil back and forth along a second axis.

11. The vehicle charging system according to claim 10, further comprising a third motor configured to move the charging inductive coil back and forth along a third axis.

12. The vehicle charging system according to claim 11, wherein the system controller is configured to operate the first motor, the second motor and the third motor to move the charging inductive coil to an optimum position for charging the receiving inductive coil based on a position and/or orientation of the receiving inductive coil.

13. The vehicle charging system according to claim 1, wherein the system controller is configured to charge the electric vehicle on request by the electric vehicle, even if a battery pack of the electric vehicle is fully charged or substantially fully charged, in order to accommodate power needs of electrically powered accessories located within the electric vehicle.

14. The vehicle charging system according to claim 1, wherein the electric vehicle has a mechanism for moving the receiving inductive coil back and forth in a first direction, wherein the first direction is towards the ground the electric vehicle is positioned over.

15. The vehicle charging system according to claim 1, wherein the system controller is configured to command an electric vehicle to move to an optimum charging position with respect to the charging inductive coil.

16. The vehicle charging system according to claim 1, wherein the system controller is configured to command an ineligible vehicle to move away from a parking space associated with the charging inductive coil, and wherein the ineligible vehicle is not eligible for charging at the vehicle charging system.

17. The vehicle charging system according to claim 1, wherein the system controller is configured to cause the charging inductive coil to periodically or continuously emit pulses of energy, wherein the system controller is configured to monitor an outward energy flow, and wherein the system controller is configured to determine if an electric vehicle is present and within charging range of the charging inductive coil based on the outward energy flow.

18. The vehicle charging system according to claim 1, wherein the system controller is configured to optimize a transfer rate of energy from the charging inductive coil to the receiving inductive coil by determining a peak transfer rate of energy position, and wherein the system controller is configured to physically direct an electric vehicle connected to the receiving inductive coil to change position towards the determined peak transfer rate of energy position.

19. The vehicle charging system according to claim 1,
wherein the charging inductive coil has a plurality of individual segments, the individual segments configured to form a plurality of different virtual charging inductive coil patterns; and
wherein the system controller is configured to operate the charging inductive coil to selectively form a particular virtual charging inductive coil pattern of the plurality of different virtual charging inductive coil patterns based on the one or more physical characteristics.

20. The vehicle charging system according to claim 1, wherein the vehicle controller is configured to direct the electric vehicle to seek to recharge a battery pack of the electric vehicle at every available charging opportunity regardless of a level or charge of the battery pack.

21. A vehicle charging system comprising:
a system controller;
a common power bus;
a plurality of charging inductive coils operatively connected to the common power bus and the system controller;
wherein the system controller is configured to initiate a charging session between a particular charging inductive coil of the plurality of charging inductive coils when an electric vehicle having a receiving inductive coil is within charging range without human input;
wherein the system controller is arranged in a base unit that is not arranged on a vehicle;
wherein the system controller is configured to cause each charging inductive coil of the plurality of charging inductive coils to periodically or continuously emit pulses of energy;
wherein the system controller is configured to monitor one or more outward energy flows; and
wherein the system controller is configured to determine if an electric vehicle is present and within the charging range of each charging inductive coil of the plurality of charging inductive coils based on the monitored outward energy flow.

22. The vehicle charging system according to claim 21, wherein the system controller is configured to selectively and dynamically electrically connect and/or electrically disconnect each charging inductive coil of the plurality of the charging inductive coils from the common power bus.

23. A vehicle charging system comprising:
a system controller;
a charging inductive coil having a plurality of individual segments, the individual segments configured to form a plurality of different virtual charging inductive coil patterns;
a receiving inductive coil;
wherein the system controller is configured to operate the charging inductive coil to selectively form a particular virtual charging inductive coil pattern of the plurality of different virtual charging inductive coil patterns; and
wherein the particular virtual charging inductive coil pattern is based on an identity of the electric vehicle being charged, and wherein the identity of the electric vehicle being charged comprises a year, make and/or model of the electric vehicle being charged.

24. The vehicle charging system according to claim 23, wherein the system controller is configured to automatically and dynamically operate the charging inductive coil to form the particular virtual charging inductive coil pattern such that an optimized transfer rate of a transfer of energy from the charging inductive coil to the receiving inductive coil that occurs with the particular virtual charging inductive coil pattern is greater than or equal to the transfer rate of other virtual charging inductive coil patterns of the plurality of different virtual charging inductive coil patterns.

25. The vehicle charging system according to claim 24, wherein the system controller is configured to activate and/or deactivate a plurality of segments of the charging inductive coil in order to form the particular virtual charging inductive coil pattern.

26. The vehicle charging system according to claim 23, wherein the system controller is configured to optimize a transfer rate of energy from the charging inductive coil to the receiving inductive coil by determining a peak transfer rate of energy position, and wherein the system controller is configured to physically direct an electric vehicle connected to the receiving inductive coil to change position towards the determined peak transfer rate of energy position.

27. The vehicle charging system according to claim 23, wherein the system controller is configured to determine the identity of the electric vehicle being charged based on communication with a vehicle controller of the electric vehicle.

28. The vehicle charging system according to claim 23, wherein the system controller is configured to optimize the location of the charging inductive coil relative to the receiving inductive coil and/or to optimize the location of the receiving inductive coil relative to the charging inductive coil based on the identity of the electric vehicle being charged.

29. The vehicle charging system according to claim 23, wherein the system controller is configured to operate the charging inductive coil to selectively form the particular virtual charging inductive coil pattern prior to a presence of the electric vehicle over the charging inductive coil.

30. A vehicle charging system comprising:
a system controller;
a charging inductive coil;
a receiving inductive coil connected to an electric vehicle; and
a vehicle controller arranged on the electric vehicle;
wherein the system controller is configured to self-initiate a charging session between the charging inductive coil and the receiving inductive coil without human input;
wherein the system controller is configured to cause the charging inductive coil to periodically or continuously emit pulses of energy;
wherein the system controller is configured to monitor an outward energy flow; and
wherein the system controller is configured to determine if an electric vehicle is present and within the charging range of the charging inductive coil based on the monitored outward energy flow.

* * * * *